May 14, 1968 M. C. NOBLE 3,382,528
FOOD MOLDING MACHINE
Filed May 27, 1966 3 Sheets-Sheet 1
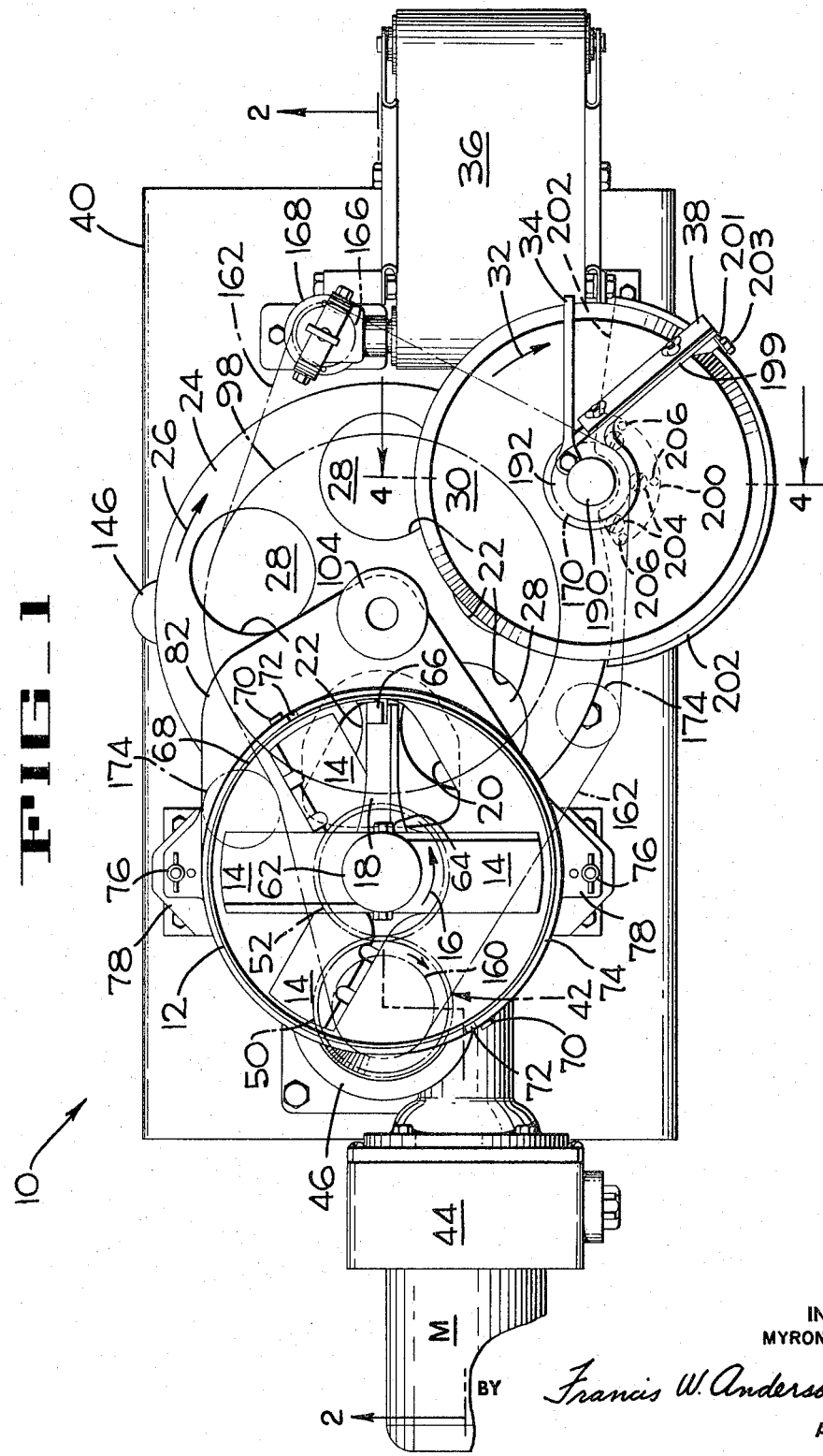
FIG_1
INVENTOR
MYRON C. NOBLE
BY Francis W. Anderson
ATTORNEY

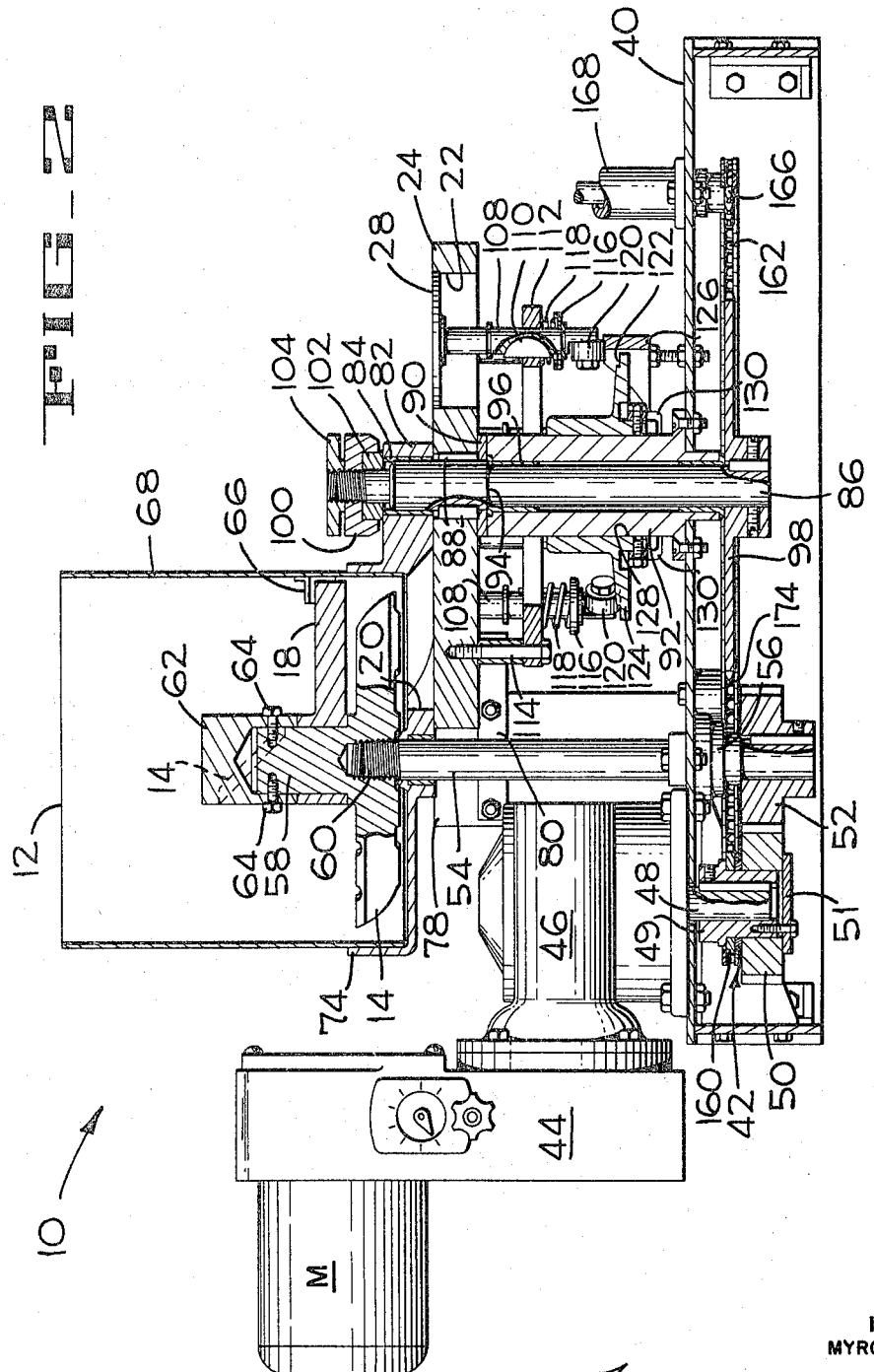

May 14, 1968
M. C. NOBLE
3,382,528
FOOD MOLDING MACHINE
Filed May 27, 1966
3 Sheets-Sheet 3
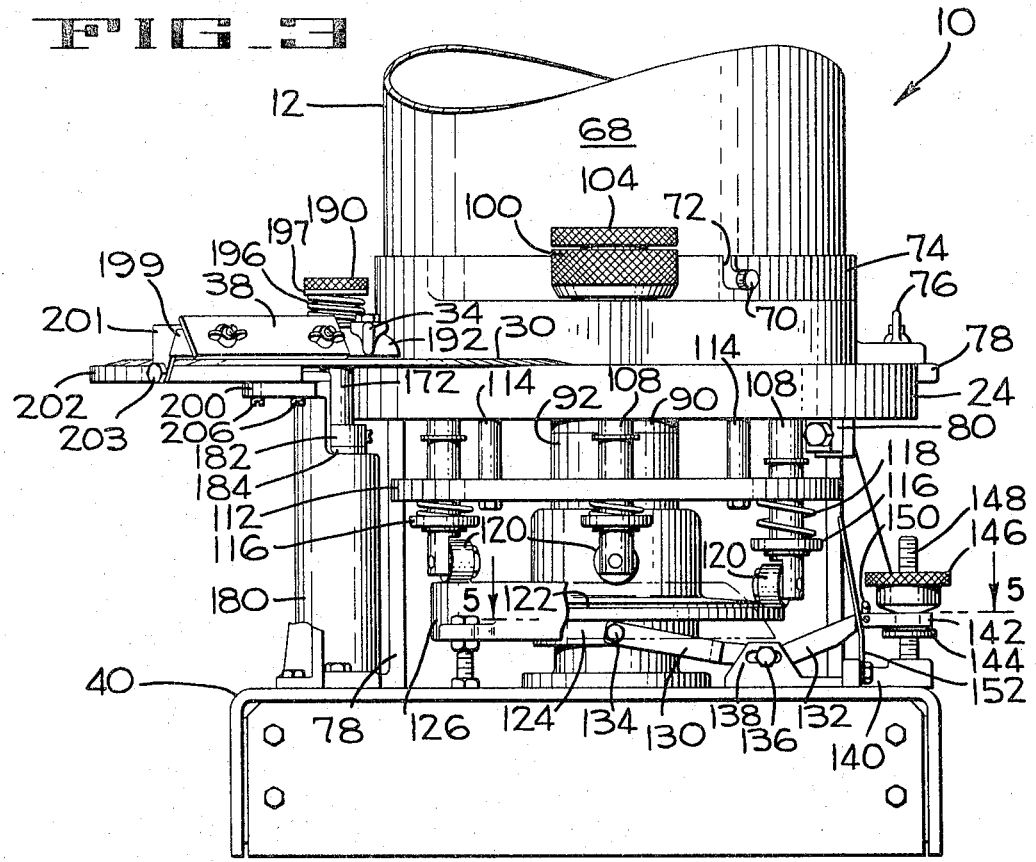
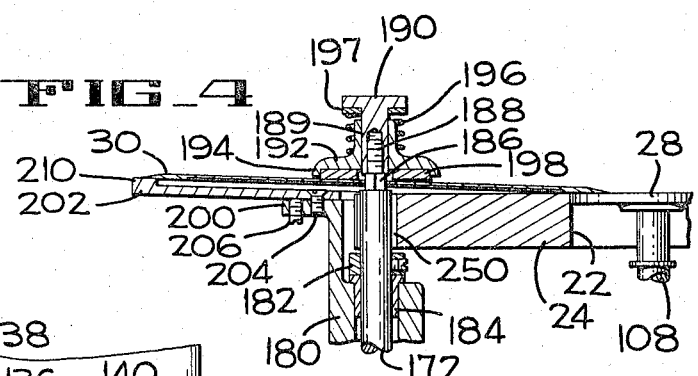
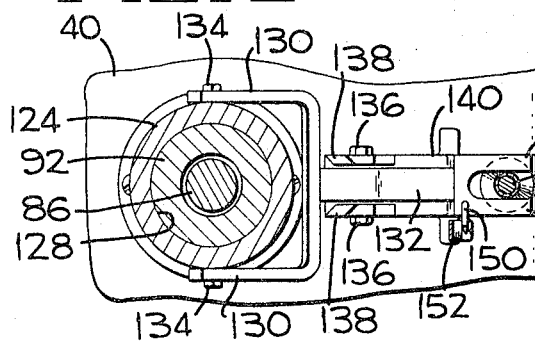
INVENTOR
MYRON C. NOBLE
BY *Francis W. Anderson*
ATTORNEY United States Patent Office 3,382,528
Patented May 14, 1968

1

3,382,528
FOOD MOLDING MACHINE
Myron C. Noble, Hoopeston, Ill., assignor to FMC Corporation, San Jose, Calif., a corporation of Delaware
Filed May 27, 1966, Ser. No. 553,400
5 Claims. (Cl. 17—32)

The present invention concerns apparatus for molding plastic food products, such as ground meat, into patties of predetermined size and weight. More specifically, the present invention provides an improved food molding machine for molding ground meat particles at extremely high production rates.

An object of the present invention is to provide an improved, high speed food molding machine.

Another object of the invention is to provide an efficient food molding machine which is capable of sustained high speed operation, yet is less costly than other high output molding machines.

A further object of the invention is to provide a ground meat molding machine having an improved, powered spatula blade for automatically lifting and conveying the formed meat patties from the machine.

A further object is to provide an improved spatula blade structure which lightly forces the knife downward into scraping engagement against the support surface for the patties while shearing the patties therefrom.

Other objects and advantages of the present invention will become apparent from the following description and the accompanying drawings, wherein:

FIGURE 1 is a plan of the food molding machine of the present invention.

FIGURE 2 is a vertical section taken along lines 2—2 on FIGURE 1.

FIGURE 3 is an end elevation of the discharge end of the machine with the discharge conveyor removed.

FIGURE 4 is a vertical section taken along lines 4—4 on FIGURE 1.

FIGURE 5 is a horizontal section taken along lines 5—5 on FIGURE 3.

In brief, the food molding machine 10 (FIGS. 1 and 2) operates in accord with known rotary types of prior art molding machines and has a stationary hopper 12 into which frozen ground meat particles are placed. A plurality of driven impeller blades 14 in the hopper rotate in the direction of the arrow 16 and have inclined leading surfaces which force the meat particles under a stationary diverter blade 18 and downward through a bottom outlet 20. The ground meat is fed into successive feed pockets 22 that are formed in a rotatable turret 24 which revolves in the direction of the arrow 26 and carries the pockets under the outlet 20. Each feed pocket 22 has a bottom wall formed by a vertically adjustable piston 28. The pistons have a common adjustment mechanism that presets the depth of the pistons in the feed pockets, and thus controls the thickness and weight of the patties formed in the feed pockets.

As a filled feed pocket moves out from under the area of the hopper, the piston is moved to an upper position in the feed pocket, in which position the piston lies flush with the upper surface of the turret and with the undersurface of a driven circular spatula blade 30. A particular feature of the present invention is structure associated with the spatula blade which maintains the blade in light-pressure sliding engagement with the piston and turret surfaces so that the patty carried atop the piston is neatly sheared from the piston. After being thus removed, the patty is carried by the spatula blade, in the directon of the arrow 32, diagonally against a fixed stop bar 34 which directs the patty onto a conventional discharge conveyor 36 for delivery to other processing machinery. Any small par-

2 ticles which might adhere to the spatula blade 30 are scraped off by a fixed scraper knife 38.

With more specific reference to FIGURES 1 and 2, the food molding machine 10 has a shallow hollow base 40 which encloses a composite gear and roller chain drive train 42 and supports all other components of the machine. Power for the drive train 42 is supplied by an electric motor M. The motor drives a variable-speed transmission 44 that is coupled to a gearbox 46 having a depending output shaft 48. A gear 50 is journalled on a hub 49 that is keyed to the shaft 48. The gear 50, which is connected in driving engagement with hub 49 through a clutch plate 51, is in meshing engagement with a similar gear 52. The gear 52 is keyed to a vertically disposed impeller shaft 54 which projects upwardly through a bearing 56 and into the hopper 12 for driving the impeller blades 14.

The three lowermost impeller blades are integrally formed upon a hub 58, having a threaded internal bore, which is adapted to be screwed onto a threaded upper end portion 60 of the impeller shaft 54. The upper portion of the impeller hub 58 carries two impeller blades 14 formed upon a hollow hub 62 which is locked by bolts 64 to the hub 58. Circumscribing the hub 58 intermediate the upper and lower sets of impeller blades is the apertured end portion of the stationary diverter blade 18. Although the diverter blade is rotatable on the hub 58 for disassembly purposes, the ground meat thrust by the impeller blades 14 against the diverter blade keep it seated against a stop angle 66 which is secured inside a cylindrical hopper wall 68.

The hopper wall is releasably retained by pins 70 which project outward from the wall 68 and are each locked in a J-slot 72 of a hopper base casting 74. Thumbscrews 76 hold the base 74 atop two pedestals 78. Each pedestal 78 (FIG. 2) has a turret support bar 80 bolted thereto (only one bar being shown) which extends under and supports the turret 24. Since the turret slides upon the bar 80, the bar is preferably formed of a metal dissimilar from the turret, or of a suitable plastic, so as to minimize friction.

Part of the hopper base 74 extends in the form of a horizontal flange 82 beyond the turning axis of the turret in the general direction of the spatula blade 30 and has a sleeve bearing 84 (FIG. 2) which rotatably journals the upper end portion of a turret driveshaft 86. The turret is held by keys 88 to the driveshaft 86, but can be lifted off the driveshaft for disassembly when the machine is cleaned. A thrust bearing 90 is in supporting engagement with the turret 24 and is in turn supported atop an upright hub 92 which is bolted to the upper surface of the base 40 and rotatably journals the turret driveshaft 86.

The turret driveshaft has an enlarged upper end portion providing a radial support surface at 94 which rests upon the adjacent end of a sleeve bearing 96. At its lower end portion the turret driveshaft 86 is fixed to a sprocket 98 which is a part of the composite gear and roller chain drive train 42 and is later mentioned.

The upper end portion of the driveshaft 86 has a handwheel 100 threaded thereon which has a recessed base with a thrust bearing 102 mounted therein in supported engagement with the flange 82 of the hopper base 74. A second handwheel 104 is threaded onto the driveshaft 86 above the handwheel 100 so that the two handwheels and the thrust bearing 102 rotate with the driveshaft 86. By proper adjustment of the handwheel 100, the turret 24 is held in close proximity to the undersurface of the flange 82.

Each piston 28 (FIG. 2) has a depending piston rod 108 which carries a key 110 and extends downward through a ring guide 112. The ring guide is bolted to the undersurface of the turret by a plurality of bolts and spacers 114 (FIG. 3), and has generally radial slotted portions in which the keys 110 slide so that the piston rods 108 are prevented from rotating. The lower end portion of each piston rod 108 has a snap ring mounted thereon in supporting relation to a spring cup 116 that holds a compression spring 118 which bears against the lower surface of the ring guide 112 to urge the pistons 28 downward in the pockets 22.

A cam follower roller 120 is rotatably mounted on the lower end portion of each piston of each piston rod 108 and has a turning axis radially related to the turning axis of the turret. The axial dimension of each follower roller 120 is such that the inner portions of the rollers lie in vertical alignment with a horizontal annular support surface 122 of a vertically adjustable stop cam 124. The outer portions of the rollers thus lie outward of the annular support surface 122 and are arranged in one sector of their travel about the axis of the turret driveshaft to be lifted upward from said support surface by a fixed, arcuate ejector cam segment 126 that is bolted to the base 40. In the well-known manner, the lowermost position of the pistons, as determined by the elevation of the stop cam 124, controls the amount of ground meat that can be charged into the pockets 22, and the uppermost position of the pistons, as regulated by the ejector cam segment 126, places the tops of the pistons flush with the upper surface of the turret so that the formed patties are ejected from the pockets.

The stop cam 124 (FIGS. 2 and 5) has a central bore 128 which permits it to slide freely up and down over the outer surface of the hub 92. For the purpose of adjusting the elevation of the stop cam 124, the yoke arms 130 of a pivot lever 132 are pivoted to the lower end portion of the stop cam by bolts 134. Intermediate its ends, the lever 132 is pivoted by bolts 136 to upstanding tabs 138 of a lever support 140. Because the lever is subject to a small amount of endwise movement, the tabs 138 are provided with elongate slots for the bolts 136.

The other end of the lever 132 has two spaced yoke arms 142 which rest in a spool at 144 that is formed in a thumbnut 146. The thumbnut is threaded onto a fixed, threaded stud 148 which projects upward from the lever support 140. Up and down adjustment of the thumbnut on the stud 148 thus adjusts the elevation of the stop cam 124 to adjust the thickness, and hence weight, of the patties formed above the pistons, and the various thicknesses are indicated by a pin 150 (FIGS. 3 and 5) that is carried by the pivot lever 132 and traverses a scale 152 which is bolted to the lever support 140. The scale 152 has indicia which corresponds to thickness of the patties, and thus indirectly indicates the weights of the patties. It is an important feature of the invention that the patty thickness can be changed while the machine is in operation.

The drive components of the previously mentioned composite gear and chain drive train 42 include a sprocket 160 (FIGS. 1 and 2) which is secured to the output shaft 48 of the gearbox 46. A roller chain 162 is trained around the sprocket 160, over the sprocket 98 on the turret driveshaft 86, and over a sprocket 166 on a tower shaft assembly 168 that drives the discharge conveyor 36. Both the discharge conveyor assembly and the tower shaft assembly are of known construction and their details are not important to the present disclosure since other discharge conveying means can be used.

The chain 162 is also trained around a sprocket 170 that drives a spatula blade driveshaft 172 (FIG. 4), and around idler sprockets 174, as required. Thus, the turret 24 and the spatula blade 30 rotate clockwise, as viewed in FIGURE 1, and the spatula blade is rotated at a speed higher than the speed of the turret. With the drive train herein disclosed, the turret 24 is operated at 24 r.p.m. to produce 7200 patties per hour with the five pocket turret, and the spatula blade 30 operates at approximately 112 r.p.m. By replacing the five pocket turret with a seven pocket turret, and operating the machine at the same speed, over 10,000 patties per hour are produced.

As thus far described, the food molding machine 10 follows general structural and operational details known in prior art food molding machines.

A particular feature of the invention concerns the structure and operation of the spatula blade 30, by means of which the meat patties are sheared from the tops of the pistons 28 and are directed onto the discharge conveyor 36. Since the shearing action must occur at the interface of the spatula blade and the pistons if no meat particles are to remain adhered to the pistons, the spatula blade structure includes special provisions for maintaining the blade in light sliding contact with the upper surface of the turret and pistons.

The spatula blade driveshaft 172 (FIGS. 3 and 4) is mounted in a tubular, upstanding pedestal 180 that is bolted to the upper surface of the base 40. The upper end portion of the pedestal is relieved to provide clearance for the turret 24, and the driveshaft 172 is provided with a set collar 182 which rests atop the flanged upper end of a sleeve bearing 184 to support the driveshaft in the pedestal.

A square-section upper end portion 186 of the driveshaft extends through a corresponding central square aperture in the spatula blade, the aperture being large enough to permit the spatula blade to assume a position non-perpendicular to the turning axis of the driveshaft. Above the square portion 186, the driveshaft is provided with a threaded stud 188. Threaded onto the stud 188 is the internally threaded shank 189, of a thumbscrew 190, having a spring and bearing retainer member 192 slidably mounted thereon. As presently described, means are provided to prevent the member 192 from rotating with the driveshaft 172. An enlarged radial flange 194 of the retainer 192 supports one end of a spring 196 which is lightly compressed between the flange and a thrust washer 197 under the head of the thumbscrew 190, thereby urging the retainer 192 downward toward the spatula blade 30. The lower surface of the flange 194 is recessed and retains a nylon bearing annulus 198 which presses downward upon the spatula blade.

An arcuate, radial flange 200 is formed on the upper end portion of the pedestal 180, and supports a flat, arcuate spatula blade support plate 202. As shown in FIGURE 1, the support plate 202 has a radial extent of nearly 180 degrees around the turning axis of the spatula knife 30, and is substantially symmetrical about a vertical plane bisecting the spatula blade and that turret feed pocket 22 which is partially under the spatula blade. Further, the support plate is arranged to be tilted relative to the spatula blade which overlies the support plate 202 is elevated, and the segment of the spatula blade which overlies the last-mentioned feed pocket 22 is thereby held in light sliding engagement with the upper surface of the piston 28 in said pocket.

As previously mentioned, the spring and bearing retainer member 192 is prevented from rotating with the driveshaft 172. Thus, the wiper blade 38 (FIG. 3) is mounted on an arm 199 which extends outward from the member 192 and has an outer depending tab 201 which is held by a bolt 203 to the edge of the support plate 202. The member 192 has bolted thereon the previously mentioned fixed stop bar 34. In order to tilt the spatula blade, the support plate 202 is held by screws 204 to the pedestal flange 200 in a manner providing tilting adjustment of the support plate. Threaded upwardly through the flange 200 adjacent each screw 204, is a set screw 206 that bears upwardly against the support plate 202.

By proper adjustment of the screws 204 and 206, the support plate 202 can be tilted from a horizontal position to a position inclined about two degrees (maximum) from horizontal; this tilting adjustment causes a peripheral upstanding pressure surface 210 of the support plate 202 to press upwardly against and elevate the corresponding outer portion of the spatula blade. The bearing annulus 198 maintains substantially uniform downward pressure upon the central portion of the blade, and the sector of the blade overlying the piston is thus urged downward.

It will be understood that the spatula blade is capable of slight flexure, and that the force of the spring 196 is relatively light. Thus, the spatula blade is subject to inconsequential wear, especially in view of its relatively slow speed, yet has light contact with substantially all of the surface of the pistons carried beneath the spatula blade. As a consequence, the patties are cleanly sheared off the tops of the pistons and no particles of meat remain on the pistons to adversely affect the weights of the patties.

While a particular embodiment of the food molding apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired, is:

1. In a food molding machine including a rotatable driveshaft, a turret mounted upon said driveshaft and defining a plurality of filling pockets equidistantly spaced about the turning axis of said driveshaft, the bottom end wall of each of said pockets being formed by a movable piston which is moved to an upper raised position flush with the upper surface of the turret to eject a patty previously molded in the pocket, the improvement comprising a circular spatula blade having a turning axis laterally spaced from the turning axis of said turret, means for rotating said blade about its axis, said blade having a peripheral segment overlying a sector of said turret at which each piston approaching said blade is in its upper raised position, and blade tilting means maintaining said blade in non-planar relation to the upper surface of said turret with said blade segment in sliding contact with the upper surface of said piston to shear the patty therefrom.

2. Apparatus according to claim 1 and further including a vertical rotatable driveshaft, means mounting said spatula blade on said driveshaft for driving movement of the blade while the blade is tilted relative to a radial plane of the driveshaft, an arcuate spatula blade support plate underlying a sector of said blade diametrically opposite said peripheral segment, means for tilting said support plate relative to a radial plane of said driveshaft so that the latter blade sector is held in an elevated position by said support plate, and upwardly yieldable means mounted on said driveshaft and applying downward pressure on the adjacent central portion of said blade so that the said peripheral segment of the blade is maintained in pressure engagement with said piston.

3. Apparatus according to claim 2 wherein said upwardly yieldable means includes a bearing annulus coaxially mounted on said driveshaft above the upper surface of said blade, and a compression spring urging said annulus downward into engagement with said blade.

4. Apparatus according to claim 1 wherein said spatula blade is capable of continuous upward flexure in said peripheral segment so as to attain substantially total interengagement of the blade and piston.

5. Apparatus according to claim 2 wherein said blade tilting means includes a pedestal rotatably supporting said spatula blade driveshaft, a horizontal flange projecting from said pedestal in supporting relation to said spatula blade support plate, a screw loosely securing said support plate to said flange along an arc struck from the turning axis of said driveshaft, and a setscrew threaded through said flange, said setscrew lying outward of said screw in a vertical radial plane of said axis intersecting the screw, said setscrew having an upper end bearing against said support plate whereby the screw functions as a fulcrum so that adjustment of said setscrew tilts said support plate toward and away from a plane perpendicular to the turning axis of said driveshaft.

References Cited
UNITED STATES PATENTS

| 1,911,017 | 5/1933 | Garfunkel | 17—32 |
| 2,324,202 | 7/1943 | Felton | 17—32 |

LUCIE H. LAUDENSLAGER, *Primary Examiner.*